United States Patent
Takahashi et al.

[11] Patent Number: 6,143,442
[45] Date of Patent: Nov. 7, 2000

[54] PRISMATIC BATTERY

[75] Inventors: Hiroshi Takahashi, Nyuzen-machi; Yuji Watanuki, Kurobe; Takayuki Endo, Toyama, all of Japan

[73] Assignee: Nippon Moli Energy Corp., Yokohama, Japan

[21] Appl. No.: 09/090,925

[22] Filed: Jun. 5, 1998

[30] Foreign Application Priority Data

Jun. 6, 1997 [JP] Japan .................................. 9-149219

[51] Int. Cl.[7] ............................. H01M 2/04; H01M 2/06; H01M 2/12; H01M 2/36; H01M 6/10
[52] U.S. Cl. ............................. 429/179; 429/56; 429/73; 429/94; 429/175
[58] Field of Search ............................. 429/94, 133, 56, 429/72, 162, 163, 175, 231.95, 53, 54, 55, 57, 178, 179, 180, 181, 73

[56] References Cited

U.S. PATENT DOCUMENTS

| | | | |
|---|---|---|---|
| 5,443,925 | 8/1995 | Machida et al. | 429/94 |
| 5,569,553 | 10/1996 | Smesko et al. | 429/94 X |
| 5,783,326 | 7/1998 | Hasebe | 429/94 X |
| 5,834,133 | 11/1998 | Narukawa et al. | 429/171 |
| 5,985,478 | 11/1999 | Kim . | |

*Primary Examiner*—Maria Nuzzolillo
*Assistant Examiner*—Susy Tsang
*Attorney, Agent, or Firm*—Armstrong, Westerman, Hattori, McLeland & Naughton

[57] ABSTRACT

A prismatic battery having high volumetric efficiency and good airtightness is achieved. The prismatic battery comprises a prismatic battery can, a power-generating element inserted into the prismatic battery can, which power-generating element is obtained by winding a belt form of positive electrode sheet and a belt form of negative electrode sheet with a separator interleaved therebetween, and an electrode header for sealing the prismatic battery can. The electrode header comprises a metal sheet having through-hole in a portion recessed in an upper surface thereof, through which an electrical connecting terminal passes, and insulating sheets provided on upper and lower surfaces of the recessed portion for making insulation between the metal sheet and the electrical connecting terminal. The electrical connecting terminal is crimped for fixation to the metal sheet, and is electrically connected to one electrode sheet of the power-generating element. The electrode header is sealed and fixed to the prismatic battery can at a position where the upper surface of the electrode header is flush with an upper end of the prismatic battery can.

13 Claims, 4 Drawing Sheets

PRISMATIC BATTERY

BACKGROUND OF THE INVENTION

The present invention relates generally to a prismatic battery, and more particularly to a prismatic battery comprising a terminal structure with enhanced airtightness and high volumetric efficiency.

Many varied types of batteries are used as power sources for miniature electronic equipment. Not only cylindrical batteries but also prismatic batteries able to make effective use of small spaces are widely used to make accommodations to the miniaturization of equipment. Referring typically to one example of a closed type prismatic battery shown in FIG. 7, a power-generating element is inserted into a metallic battery can 71, and the outer can is used as one electrode or a negative electrode terminal. A metal sheet 74 having a thin portion 73 acting as a safety valve is welded to one opening 72 in the battery can, and the side of the battery can opposite to the opening 72 is provided with a projecting opening, through which a positive electrode terminal 75 of aluminum, etc. coupled to the power-generating element is led out. While an insulating bush 76 having a hole through its substantially central portion is inserted over the positive electrode terminal 75, the projecting opening is sealed from its sides by means of pressing and crimping, thereby closing up the battery can.

However, problems with the prismatic battery comprising such a positive terminal structure are that 1) the volumetric efficiency of the positive terminal structure is low due to the height of the projecting portion of the positive terminal when the prismatic battery is built in equipment, 2) the positive electrode terminal is sensitive to external force, and 3) it is difficult to maintain stabilized air tightness. Problems 2), and 3) may be solved by a selection of the optimum production conditions or material. However, structural problem 1) with the projecting portion of the positive electrode terminal is difficult to solve.

It is therefore an object of the present invention to provide a prismatic battery which is suitable as a power source for miniature electronic equipment and has high volumetric efficiency, and comprises an electrode terminal portion having high airtightness.

SUMMARY OF THE INVENTION

The present invention provides a prismatic battery comprising a prismatic battery can, a power-generating element inserted into said prismatic battery can, said power-generating element obtained by winding a belt form of positive electrode sheet and a belt form of negative electrode sheet with a separator interleaved therebetween, and an electrode header for sealing said prismatic battery can, wherein:

said electrode header comprises a metal sheet having through-hole in a portion recessed in an upper surface thereof, through which an electrical connecting terminal passes, and insulating sheets provided on upper and lower surfaces of said recessed portion for making insulation between said metal sheet and said electrical connecting terminal, said electrical connecting terminal being crimped for fixation to said metal sheet, said electrical connecting terminal being electrically connected to one electrode sheet of said power-generating element, and said electrode header being sealed and fixed to said prismatic battery can at a position where said upper surface of said electrode header is flush with an upper end of said prismatic battery can.

Preferably, the electrode header is provided with a portion for releasing an abnormal pressure, said portion being thinner than the rest of said electrode header.

Preferably, the upper surface of said electrode header is provided with an electrolyte-pouring small hole which, upon pouring of an electrolyte, is sealed with a metal piece.

The present invention also provides a prismatic battery with a power-generating element inserted into a prismatic battery can, said power-generating element obtained by winding a belt form of positive electrode sheet and a belt form of negative electrode sheet with a separator interleaved therebetween, wherein an outer surface of one electrode sheet on an outermost portion of said power-generating element is free of an active material.

Preferably, the power-generating element is electrically connected to said prismatic battery can by direct contact of said active material-free outer surface with an internal surface of said prismatic battery can.

DESCRIPTION OF THE PREFERRED EMBODIMENT

The present invention will now be explained with reference to the accompanying drawings.

Figure 1:
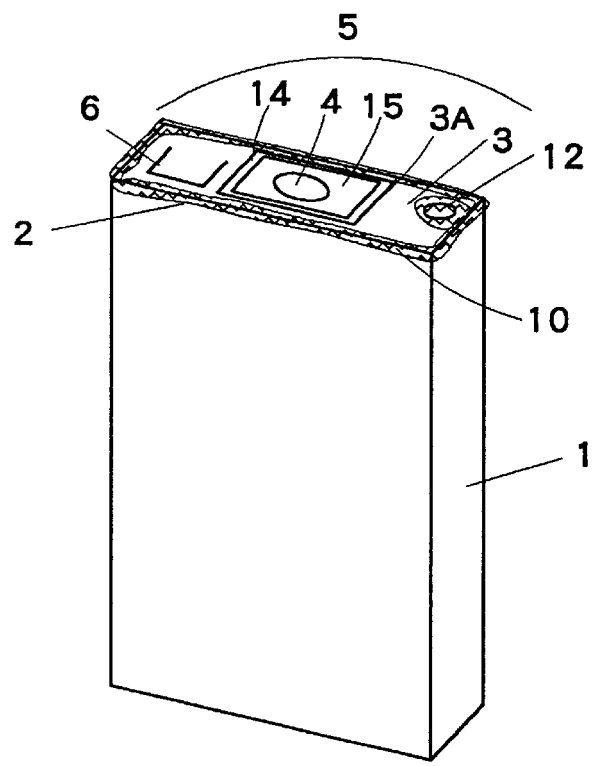
FIG. 1 is a perspective schematic illustrative of one embodiment of the prismatic battery according to the present invention.

FIG. 1 is a perspective schematic illustrative of one embodiment of the prismatic battery according to the present invention.

A jelly roll is inserted into a prismatic metal can (which will hereinafter be called a battery can)-formed of stainless steel, a soft steel nickeled on the surface, etc. An upper end 2 of the battery can 1 is sealed by mounting an electrode header 5 thereon in such a manner that the upper end 2 of the battery can is flush with an upper surface of the electrode header 5. The electrode header 5 comprises a metal sheet 3, and an electrical connecting terminal 4 (which will hereinafter be referred to as a positive terminal-leading pin) mounted onto a portion 3A recessed in the metal sheet 3 with an external insulating sheet 14 and a positive electrode-leading terminal 15 sandwiched therebetween. A part of the electrode header 5 is provided with a portion 6 thinner than the rest thereof so as to release an abnormally increasing internal pressure, if any, from within the battery, and an electrolyte-pouring small hole 12 which is to be sealed upon the pouring of an electrolyte. The electrolyte is poured through the small hole 12 into the battery can, and a metal ball such as a stainless steel ball is then embedded into the small hole 12 for sealing by resistance welding. If a protective film 10 having good moistureproofness and airtightness, such as one formed of tar or epoxy resin, is formed on the welded surface between the battery can 1 and the electrode header 5, and on the welded surface of the small hole 12 in the electrode header, it is then possible to improve the rustproofness of the battery. When a metal susceptible to corrosion under normally available conditions such as a soft steel coated with nickel on the surface is used as a substrate, the substrate is unavoidably exposed by welding. It is thus important to form protective films on welded areas.

Figure 2:
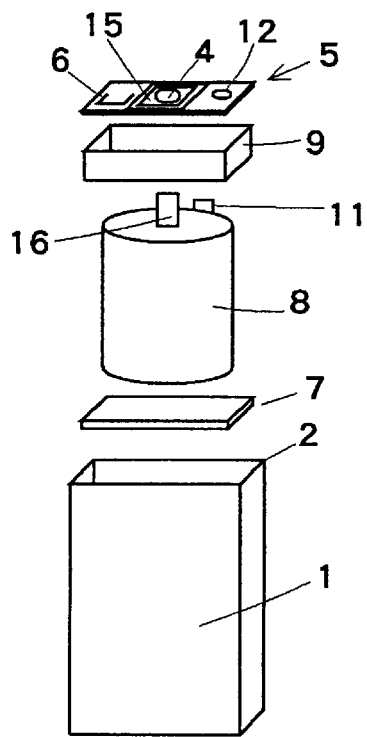
FIG. 2 is an exploded schematic illustrative of one embodiment of the prismatic battery according to the present invention.

FIG. 2 is an exploded perspective view illustrative of one embodiment of the prismatic battery according to the present invention. On the internal bottom of the prismatic battery can 1 formed of stainless steel or soft steel nickeled on the surface, there is placed a sheet form of bottom insulator 7 formed of polypropylene, polyethylene, etc., or a tape form of bottom insulator 7 formed of polyimide. A jelly roll 8 is then inserted into the battery can 1, followed by the insertion of an upper insulating sheet 9 formed of polypropylene, polyethylene, etc. The jelly roll 8 is prepared by winding a positive electrode sheet coated with a positive electrode active material and an negative electrode sheet coated with an negative electrode active material in an opposite relation to each other and with a separator interleaved between them. A positive electrode tab 16 led out of a portion of the positive electrode sheet located substantially in the vicinity of the winding center of the jelly roll 8 is electrically connected to a positive electrode-leading pin 4 of an electrode header 5 while an negative electrode tab 11 led out of the negative electrode sheet on the outer periphery of the jelly roll is welded to the upper surface of the battery can for electrical connection thereto.

The electrode header 5 is coupled by resistance welding or laser welding to the battery can in such a manner that the upper surface of the electrode header 5 is flush with an upper end 2 of the battery can. The electrode header 5 is provided with a thin portion 6 acting as a valve for releasing an abnormally increasing internal pressure, if any, from within the battery, and an electrolyte-pouring small hole 12 which, upon the pouring of an electrolyte, is to be sealed by a stainless steel ball or a metal piece such as a stainless steel piece embedded therein as by welding.

Figure 3:
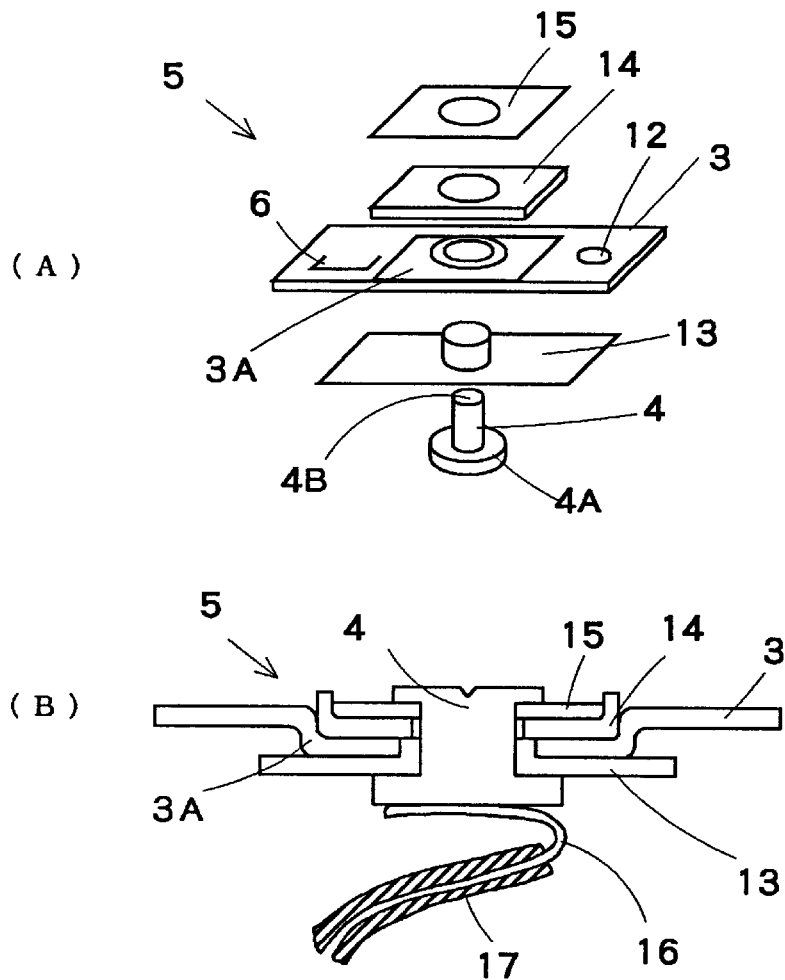
FIGS. 3(A) and 3(B) are illustrative of one embodiment of the electrode header according to the present invention.

FIG. 3(A) is an exploded perspective view illustrative of one embodiment of the electrode header used in the present invention, and FIG. 3(B) is a sectional view illustrative of the electrode header assembly.

An internal insulating sheet 13 formed of polypropylene, fluorocarbon resin, etc. is mounted on a flange 4A of a positive electrode-leading pin 4 formed of an electrically good conductor metal such as aluminum or an aluminum alloy. Then, a metal sheet 3 such as a stainless steel sheet or a nickeled soft steel sheet is inserted over the internal insulating sheet 13. The metal sheet 3 comprises a detonation-preventing surface portion 6 thinner than the rest thereof, an electrolyte-pouring small hole 12, and a portion 3A formed on the upper surface thereof and having a through-hole. Subsequently, an external insulating sheet 14 formed of polypropylene, fluorocarbon resin, etc. is inserted over the insulating metal sheet 13. Thereupon, an electrode-leading terminal sheet 15 formed of a nickel sheet, a nickeled iron, copper or nickel silver sheet, etc. is inserted over the external insulating sheet 14. Finally, a tip 4B of the positive electrode-leading pin 4 is crimped from above and below to form an electrical connecting terminal with the positive electrode-leading terminal 15, thereby fabricating an electrode header 5 as an integral assembly.

The positive electrode-leading pin 4 is electrically connected at its lower portion with a positive electrode tab 16 protected by a polyimide, fluorocarbon resin or other insulator 17.

Figure 4:
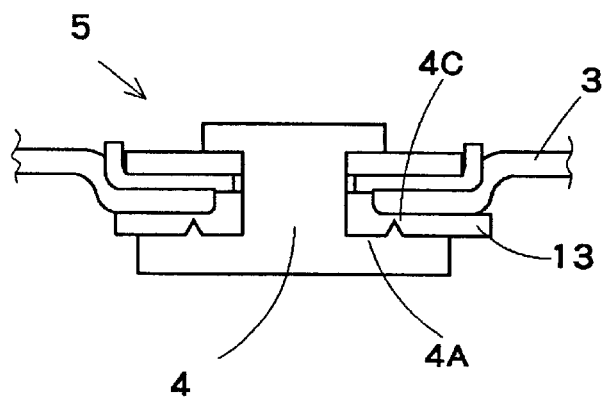
FIG. 4 is illustrative of another embodiment of the prismatic battery according to the present invention.

FIG. 4 is a sectional view illustrative of an electrode header used in another embodiment of the present invention.

A positive electrode-leading pin 4 is provided at its flange face 4A with a trigonally pyramidal, trapezoidal or semicircular form of projection 4C, so that the positive electrode-leading pin 4 can be brought in closer contact with the internal insulating sheet 13 to form an electrode header with improved airtightness.

The battery comprising a battery can as a negative electrode and an electrode header portion as a positive electrode has been explained. However, it is understood that a battery opposite in polarity to the battery shown in FIGS. 1 to 4 may be fabricated by constructing a battery can serving as a positive electrode terminal of aluminum or an aluminum alloy, using copper to construct a positive electrode-leading pin of an electrode header, and constructing a metal sheet of the electrode header of aluminum or an aluminum alloy.

To use the electrode header as the negative electrode, the positive electrode-leading pin of aluminum is first replaced by a negative electrode-leading pin of copper or a copper alloy. Then, an internal insulating sheet is inserted. Subsequently, a sheet of aluminum or an aluminum alloy, which has a thinner surface portion and a through-hole in a recessed portion, is inserted, followed by the insertion of an external insulating sheet, and an electrode-leading terminal sheet formed of a nickel, copper or other sheet. Finally, a negative electrode-leading pin is crimped from above and below to construct an electrode header having an electrical connecting terminal for the negative electrode.

Figure 5:
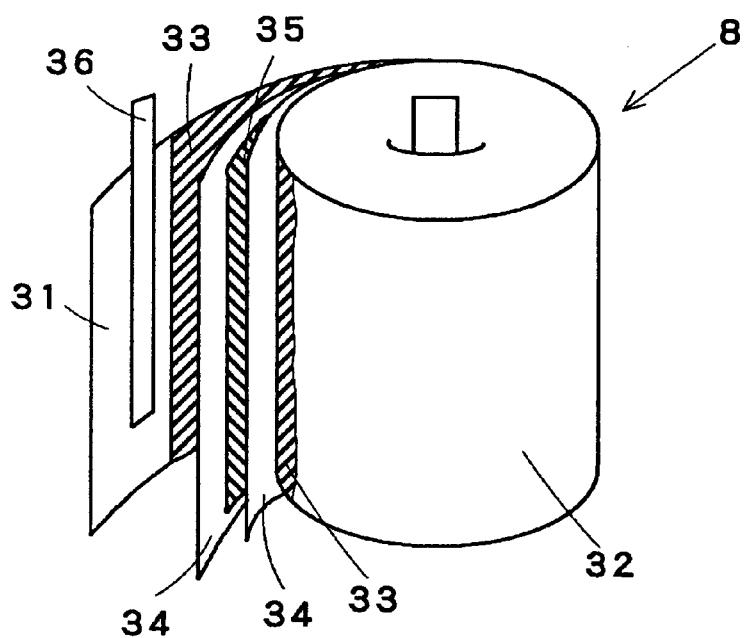
FIG. 5 is illustrative of one embodiment of the jelly roll used in the present invention.

FIG. 5 is a perspective schematic illustrative of the jelly roll to be inserted into the prismatic battery of the present invention, with the outermost portion exploded. The jelly roll is inserted into a battery can acting as a positive electrode.

A jelly roll 8 comprises a belt form of positive electrode sheet 31. An outermost aluminum foil of the positive electrode sheet 31 is not coated at its surface 32 opposite to the internal surface of a battery can with a positive electrode active material 33. The positive electrode active material 33 is coated on the back surface of the aluminum foil from its position opposite via a separator 34 to a portion of a negative electrode sheet 35 on which a negative electrode active material is present.

Then, a positive electrode tab 36 formed of aluminum is electrically connected as by resistance welding or ultrasonic welding to the positive electrode active material-free aluminum foil on the outermost side of the positive electrode sheet 31. The positive electrode tab is electrically connected to the battery can serving as a positive electrode.

The jelly roll has no electrode active material on its surface opposite to the internal surface of the battery can, and so can be available in a thinner and smaller form. It is consequently possible to make the jelly roll thinner and smaller than a can case, to thereby ensure provision of a prismatic battery having improved volumetric efficiency.

A prismatic battery having a battery can serving as a positive electrode has been explained with reference to FIG. 5. However, it is understood that even when the battery can serves as a negative electrode, similar advantages are obtainable by no application of the negative electrode active material on the outer surface of the outermost side of the negative electrode sheet.

Figure 7:
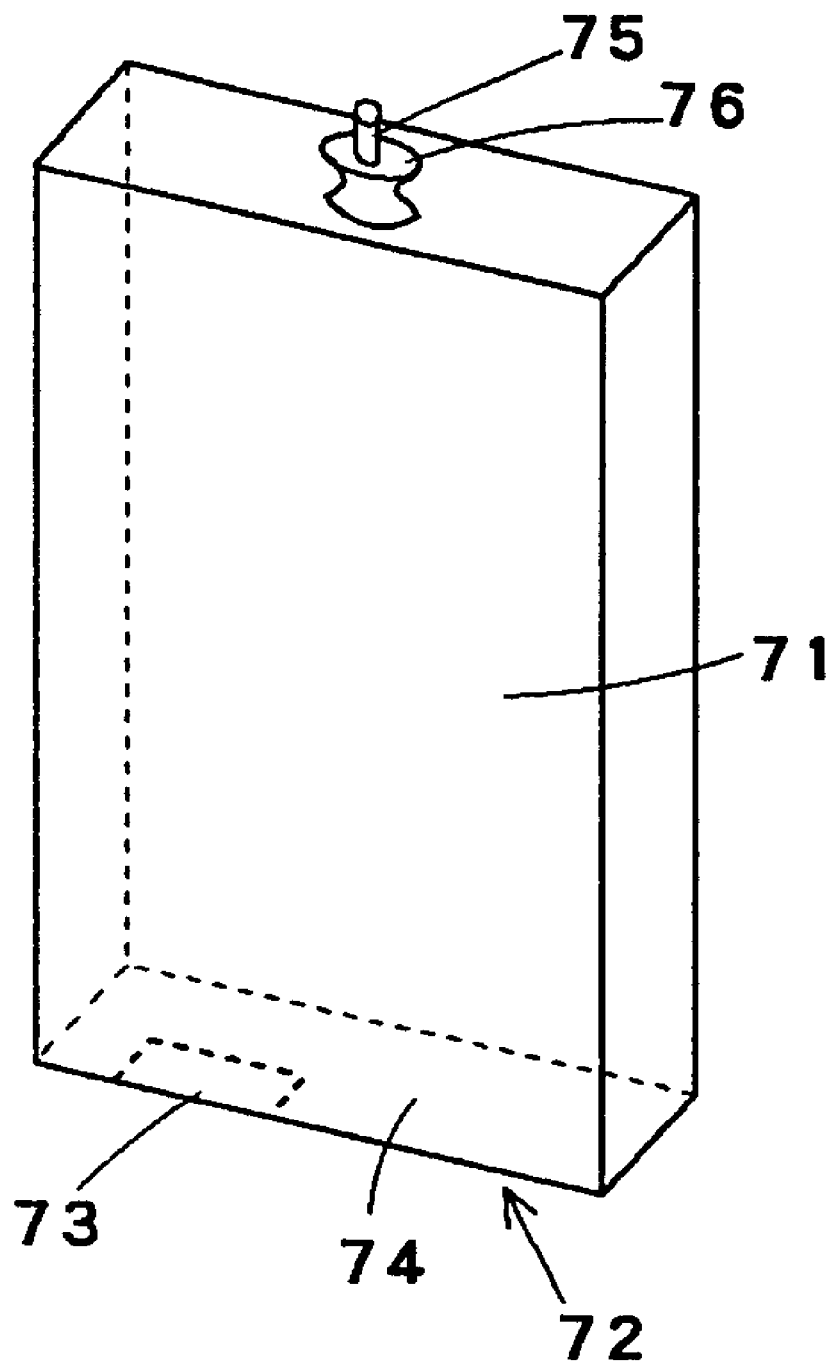
FIG. 7 is illustrative of one example of a conventional closed type prismatic battery.

As compared with a conventional battery comprising a battery can in which, as shown in FIG. 7, a projecting form of opening is provided by pressing, a battery having the electrode header structure according to the present invention can achieve an about 7% increase in battery capacity, and so has greater volumetric efficiency. This is because the power-generating element can be larger by about 3 mm than that of a generally available battery having a battery height of 48 mm.

Figure 6:
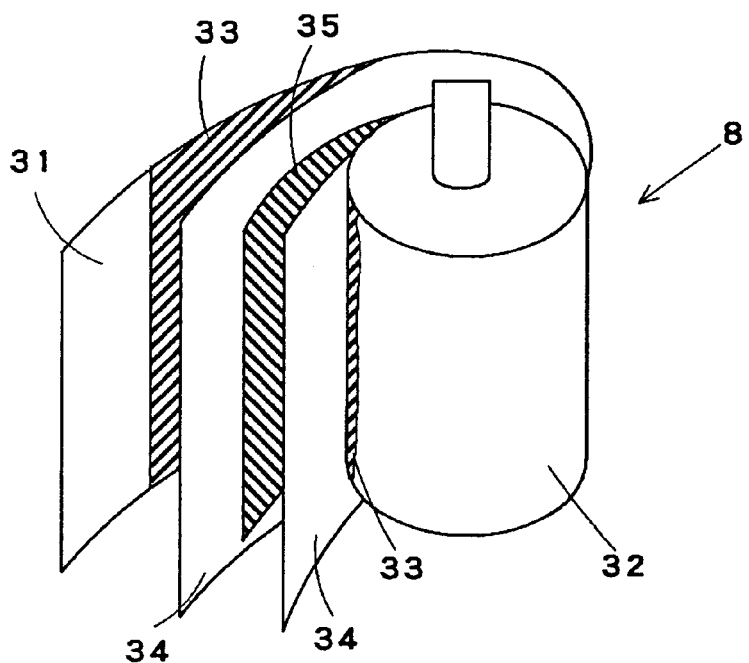
FIG. 6 is illustrative of another embodiment of the jelly roll used in the present invention.

FIG. 6 is a perspective view illustrative of another embodiment of the jelly roll according to the present invention, with the outermost portion exploded. This jelly roll is inserted into a battery can acting as a positive electrode.

As is the case with the jelly roll shown in FIG. 5, a jelly roll 8 comprises a belt form of positive electrode sheet 31. An outermost aluminum foil of the positive electrode sheet 31 is not coated at its surface 32 opposite to the internal surface of a battery can with a positive electrode active material 33. The positive electrode active material 33 is coated on the back surface of the aluminum foil from its position opposite via a separator 34 to a portion of a negative electrode sheet 35 on which a negative electrode active material is present.

In the jelly roll shown in FIG. 6, a region of the outermost portion of the positive electrode sheet 31 that is not coated with the positive electrode active material is not provided with the positive electrode tab shown in FIG. 5. Upon insertion of the jelly roll into the battery can, the outermost surface of the aluminum foil comes into direct pressure contact with the internal surface of the battery can to make electrical connections between them. Thus, the jelly roll is electrically connected to the battery can serving as a positive electrode. By removal of the positive electrode tab, it is possible to increase the size of the jelly roll serving as a power-generating element.

The prismatic battery having a battery can serving as a positive electrode has been explained with reference to FIG. 6. However, it is understood that even when the battery can serves as a negative electrode, similar advantages are obtainable if no negative electrode active material is coated on the outer surface of the outermost portion of the negative electrode sheet to make electrical connections to the battery can without using a negative electrode tab.

When the present invention is applied to a generally available lithium ion secondary battery of 8 mm in thickness, an about 10% increase in battery capacity can be achieved together with an improvement in the electrode terminal portion as already noted, and so volumetric efficiency can be improved.

The prismatic battery of the present invention comprises a specific electrode header out of which an electrode terminal is led. Insulating sheets are provided while the terminal mounted on an upper lid is sandwiched between them. In the electrode header, the terminal, insulating sheets, and upper lid are brought into close contact with one another by a rivet form of crimping pressure to achieve high airtightness. By embedding the previously fabricated electrode header in the battery can with a built-in power-generating element, and sealing and connecting them while the upper end of the battery can is flush with the header, it is possible to improve the volumetric efficiency of the battery.

What we claim:

1. A prismatic battery comprising a prismatic battery can, a power-generating element inserted into said prismatic battery can, said power-generating element obtained by winding a belt form of positive electrode sheet and a belt form of negative electrode sheet with a separator interleaved therebetween, and an electrode header for sealing said prismatic battery can, said electrode header comprising:

a metal sheet having through-hole in a portion recessed in an upper surface thereof, through which an electrical connecting terminal passes, an external insulating sheet and an internal insulating sheet provided on upper and lower surfaces of said recessed portion for making insulation between said metal sheet and said electrical connecting terminal, and an electrode-leading sheet mounted on said external insulating sheet, said electrical connecting terminal crimped for fixation to said metal sheet with said external insulating sheet and said positive electrode-leading terminal sheet sandwiched therebetween, said electrical connecting terminal electrically connected to one electrode sheet of said power-generating element, and said electrode header sealed and fixed to said prismatic battery can at a position where said upper surface of said electrode header is flush with an upper end of said prismatic battery can.

2. The prismatic battery according to claim 1, wherein said electrode header is provided with a portion for releasing an abnormal pressure, said portion being thinner than the rest of said electrode header.

3. The prismatic battery according to claim 1, wherein said upper surface of said electrode header is provided with an electrolyte-pouring hole which is sealed with a metal piece after pouring of an electrolyte.

4. The prismatic battery according to claim 1, wherein said electrode header is provided with a portion for releasing an abnormal pressure, said portion being thinner than the rest of said electrode header, and said upper surface of said electrode header is provided with an electrolyte-pouring hole which is sealed with a metal piece after pouring of an electrolyte.

5. The prismatic battery according to claim 1 with a power-generating element inserted into a prismatic battery can, wherein an outer surface of one electrode sheet on an outermost portion of said power-generating element is free of an active material.

6. The prismatic battery according to claim 1 with a power-generating element inserted into a prismatic battery can, wherein an outer surface of one electrode sheet on an outermost portion of said power-generating element is free of an active material, and said power-generating element is electrically connected to said prismatic battery can by direct contact of said active material-free outer surface with an internal surface of said prismatic battery can.

7. The prismatic battery according to claim 2 with a power-generating element inserted into a prismatic battery can, wherein an outer surface of one electrode sheet on an outermost portion of said power-generating element is free of an active material.

8. The prismatic battery according to claim 2 with a power-generating element inserted into a prismatic battery can, wherein an outer surface of one electrode sheet on an outermost portion of said power-generating element is free of an active material, and said power-generating element is electrically connected to said prismatic battery can by direct contact of said active material-free outer surface with an internal surface of said prismatic battery can.

9. The prismatic battery according to claim 3 with a power-generating element inserted into a prismatic battery can, wherein an outer surface of one electrode sheet on an outermost portion of said power-generating element is free of an active material.

10. The prismatic battery according to claim 3 with a power-generating element inserted into a prismatic battery can, wherein an outer surface of one electrode sheet on an outermost portion of said power-generating element is free of an active material, and said power-generating element is electrically connected to said prismatic battery can by direct contact of said active material-free outer surface with an internal surface of said prismatic battery can.

11. The prismatic battery according to claim 4 with a power-generating element inserted into a prismatic battery can, wherein an outer surface of one electrode sheet on an outermost portion of said power-generating element is free of an active material.

12. The prismatic battery according to claim 4 with a power-generating element inserted into a prismatic battery can, wherein an outer surface of one electrode sheet on an outermost portion of said power-generating element is free of an active material, and said power-generating element is electrically connected to said prismatic battery can by direct contact of said active material-free outer surface with an internal surface of said prismatic battery can.

13. The prismatic battery according to claim 1, which is a lithium ion battery.

* * * * *